(12) United States Patent
Kursun

(10) Patent No.: US 11,537,880 B2
(45) Date of Patent: Dec. 27, 2022

(54) SYSTEM AND METHODS FOR GENERATION OF SYNTHETIC DATA CLUSTER VECTORS AND REFINEMENT OF MACHINE LEARNING MODELS

(71) Applicant: BANK OF AMERICA CORPORATION, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 735 days.

(21) Appl. No.: 16/537,884

(22) Filed: Aug. 12, 2019

(65) Prior Publication Data

US 2021/0049456 A1    Feb. 18, 2021

(51) Int. Cl.
| | | |
|---|---|---|
| *G06N 3/08* | (2006.01) | |
| *G06K 9/62* | (2022.01) | |
| *G06N 3/04* | (2006.01) | |
| *G06N 20/20* | (2019.01) | |
| *G06Q 20/40* | (2012.01) | |
| *G06V 10/82* | (2022.01) | |

(52) U.S. Cl.
CPC ............. *G06N 3/08* (2013.01); *G06K 9/6218* (2013.01); *G06K 9/6232* (2013.01); *G06K 9/6256* (2013.01); *G06K 9/6262* (2013.01); *G06N 3/0454* (2013.01); *G06N 3/088* (2013.01); *G06N 20/20* (2019.01); *G06Q 20/4016* (2013.01)

(58) Field of Classification Search
CPC .... G06V 40/193; G06V 40/165; G06V 40/19; G06V 10/755; G06V 10/82; G06V 40/171; G06K 9/6259; G06N 3/04; G06N 3/08; G06N 3/084; G06N 3/088; G06N 3/0454; G06T 7/11; G06T 2207/20081; G06T 2207/20084; G06T 2207/20132
See application file for complete search history.

(56) References Cited

U.S. PATENT DOCUMENTS

| | | |
|---|---|---|
| 5,355,313 A | 10/1994 | Moll et al. |
| 7,398,259 B2 | 7/2008 | Nugent |
| 7,689,520 B2 | 3/2010 | Burges et al. |
| 8,234,228 B2 | 7/2012 | Weston et al. |
| 8,775,341 B1 | 7/2014 | Commons |
| 8,838,511 B2 | 9/2014 | Kristal et al. |

(Continued)

*Primary Examiner* — John W Lee
(74) *Attorney, Agent, or Firm* — Moore & Van Allen PLLC; Nicholas C. Russell

(57) ABSTRACT

Embodiments of the present invention provide an improvement to conventional machine model training techniques by providing an innovative system, method and computer program product for the generation of synthetic data using an iterative process that incorporates multiple machine learning models and neural network approaches. A collaborative system for receiving data and continuously analyzing the data to determine emerging patterns is provided. The proposed invention involves generating synthetic data clusters to be stored and used for retraining the main model as well as other models. In addition, the invention includes using one or more (subset) of the synthetic data clusters to train or retrain machine learning models, developing and training machine learning models that are trained with emerging synthetic data clusters, and ensembling machine learning models trained with emerging synthetic data clusters.

20 Claims, 5 Drawing Sheets

(56) References Cited

U.S. PATENT DOCUMENTS

| | | |
|---|---|---|
| 10,089,576 B2 | 10/2018 | Gao et al. |
| 10,339,038 B1 | 7/2019 | Singh et al. |
| 10,417,525 B2 * | 9/2019 | Ji .................... G06V 30/19127 |
| 10,459,727 B2 | 10/2019 | Chilimbi et al. |
| 10,599,957 B2 | 3/2020 | Walters et al. |
| 10,896,381 B2 | 1/2021 | Zoldi et al. |
| 11,270,206 B2 | 3/2022 | Kursun |
| 2004/0133531 A1 | 7/2004 | Chen et al. |
| 2006/0106797 A1 | 5/2006 | Srinivasa et al. |
| 2008/0021686 A1 | 1/2008 | Jojic et al. |
| 2009/0204558 A1 | 8/2009 | Weston et al. |
| 2013/0238533 A1 | 9/2013 | Virkar et al. |
| 2017/0154280 A1 | 6/2017 | Adir et al. |
| 2018/0124080 A1 | 5/2018 | Christodorescu et al. |
| 2018/0144243 A1 | 5/2018 | Hsieh et al. |
| 2018/0314938 A1 | 11/2018 | Andoni et al. |
| 2018/0365556 A1 | 12/2018 | Guttman |
| 2019/0026605 A1 * | 1/2019 | Hong .................... G06V 40/168 |
| 2019/0095629 A1 | 3/2019 | Lee et al. |
| 2019/0188562 A1 * | 6/2019 | Edwards .................. G06N 3/04 |
| 2019/0266418 A1 * | 8/2019 | Xu ....................... G05D 1/0221 |
| 2020/0111019 A1 | 4/2020 | Goodsitt et al. |
| 2020/0387833 A1 | 12/2020 | Kursun |
| 2021/0049456 A1 | 2/2021 | Kursun |
| 2021/0342645 A1 | 11/2021 | Scriven et al. |
| 2021/0357282 A1 | 11/2021 | Verma et al. |
| 2022/0020026 A1 | 1/2022 | Wadhwa et al. |
| 2022/0141239 A1 | 5/2022 | Zaman et al. |

\* cited by examiner

SYSTEM AND METHODS FOR GENERATION OF SYNTHETIC DATA CLUSTER VECTORS AND REFINEMENT OF MACHINE LEARNING MODELS

BACKGROUND

Modern artificial intelligence and machine learning techniques are applied across a wide range of fields to analyze complex data and output conclusive results. Current system architectures and techniques are typically limited in their dependence on amounts of available historic data for training purposes. These limitations reduce the reliability and adaptiveness of current machine learning systems in certain implementations wherein real-time, rapid changes in the data environment can be of particular importance, especially in the case of adversarial scenarios.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for the generation of synthetic data using an iterative process that incorporates multiple machine learning models and neural network approaches. A collaborative system for receiving data and continuously analyzing the data to determine emerging patterns is provided. Common characteristics of data from the identified emerging patterns are broadened in scope and used to generate a synthetic data set using a generative neural network approach. The resulting synthetic data set is narrowed based on analysis of the synthetic data as compared to the detected emerging patterns, and can then be used to further train one or more machine learning models for further pattern detection. The iterative synthetic data generation system generally comprises: receiving input data for analysis and expansion; analyzing the input data using a machine learning model to identify an emerging pattern in the input data; extracting common data characteristics from the identified emerging pattern in order to determine a data scenario; expanding the data scenario via general adversarial network encoding to produce expanded data scenarios; batching the expanded data scenarios to create multiple synthetic data sets containing varied subsets of the expanded data scenarios; generating one or more synthetic data vectors comprising one or more of the multiple synthetic data sets; and transmitting the one or more synthetic data vectors to one or more machine learning models in order to train the models based on varied subsets of the expanded data scenarios.

In some embodiments, generating the synthetic data set further comprises refining the multiple synthetic data sets by: processing the multiple synthetic data sets using the machine learning model to determine if the synthetic data set fits the identified emerging pattern; and iteratively narrowing the scope of one or more of the multiple synthetic data sets based the results from the machine learning model.

In some embodiments, the invention is further configured for determining one or more machine learning models as appropriate for the identified emerging pattern; and generating an ensemble of one or more machine learning models according to the identified emerging pattern.

In some embodiments, the machine learning model is retrained using a combination of real input data and one or more synthetic data vectors.

In other embodiments, the invention further comprises generating a machine learning model ensemble of the one or more machine learning models; and identifying additional emerging patterns in the received input data.

In still further embodiments, the machine learning model ensemble is continuously updated to include a subset of one or more additional machine learning models determined to meet a threshold of accuracy in identifying emerging patterns in received input data.

In other embodiments, the invention further comprises: receiving a continuous input data feed; continually updating the emerging pattern detected by the machine learning model; extracting common data characteristics from the updated emerging pattern; determining if the data scenario requires adjustment based on the updated emerging pattern; and continually producing additional synthetic data vectors via the generative adversarial neural network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
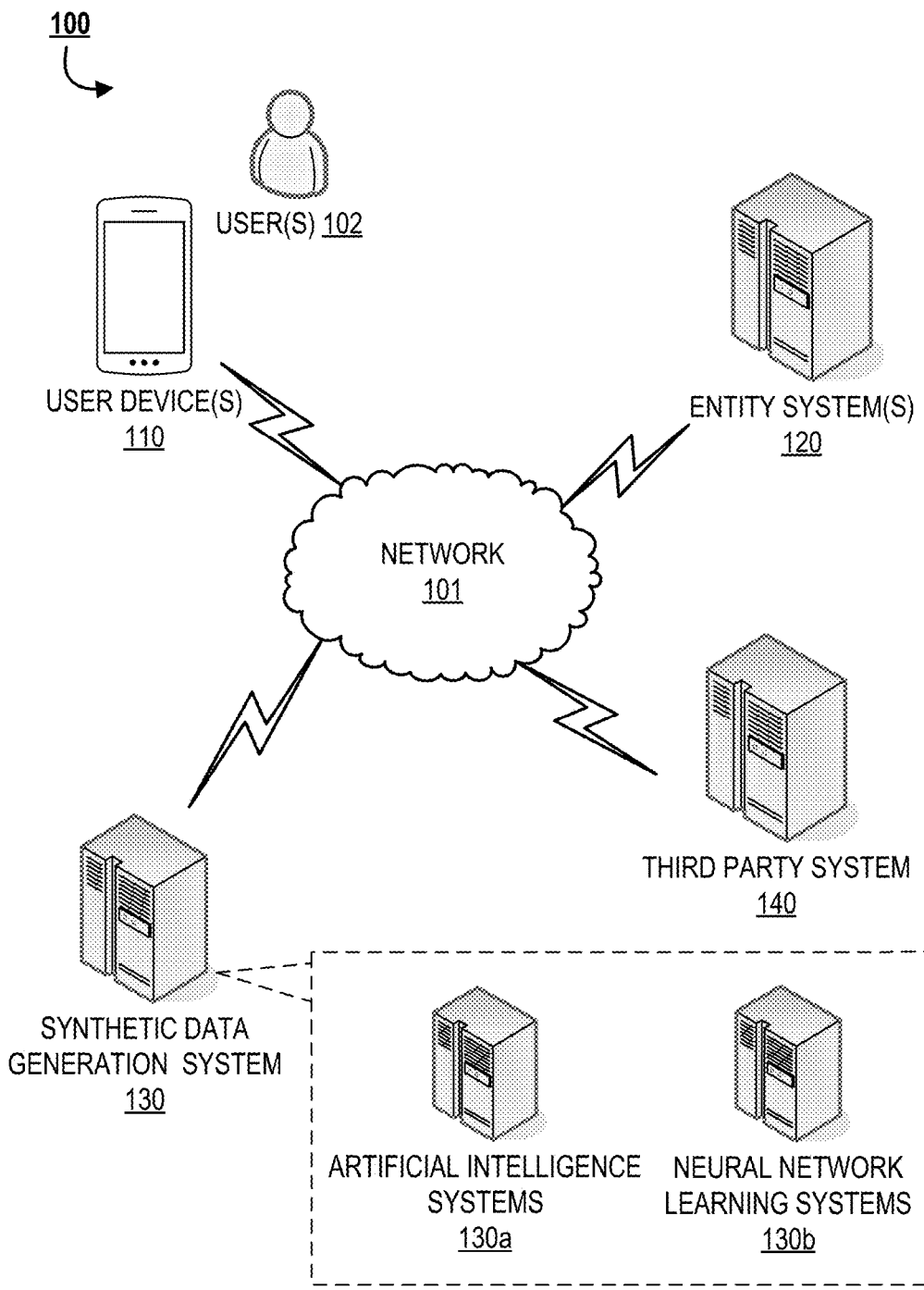
Figure 2:
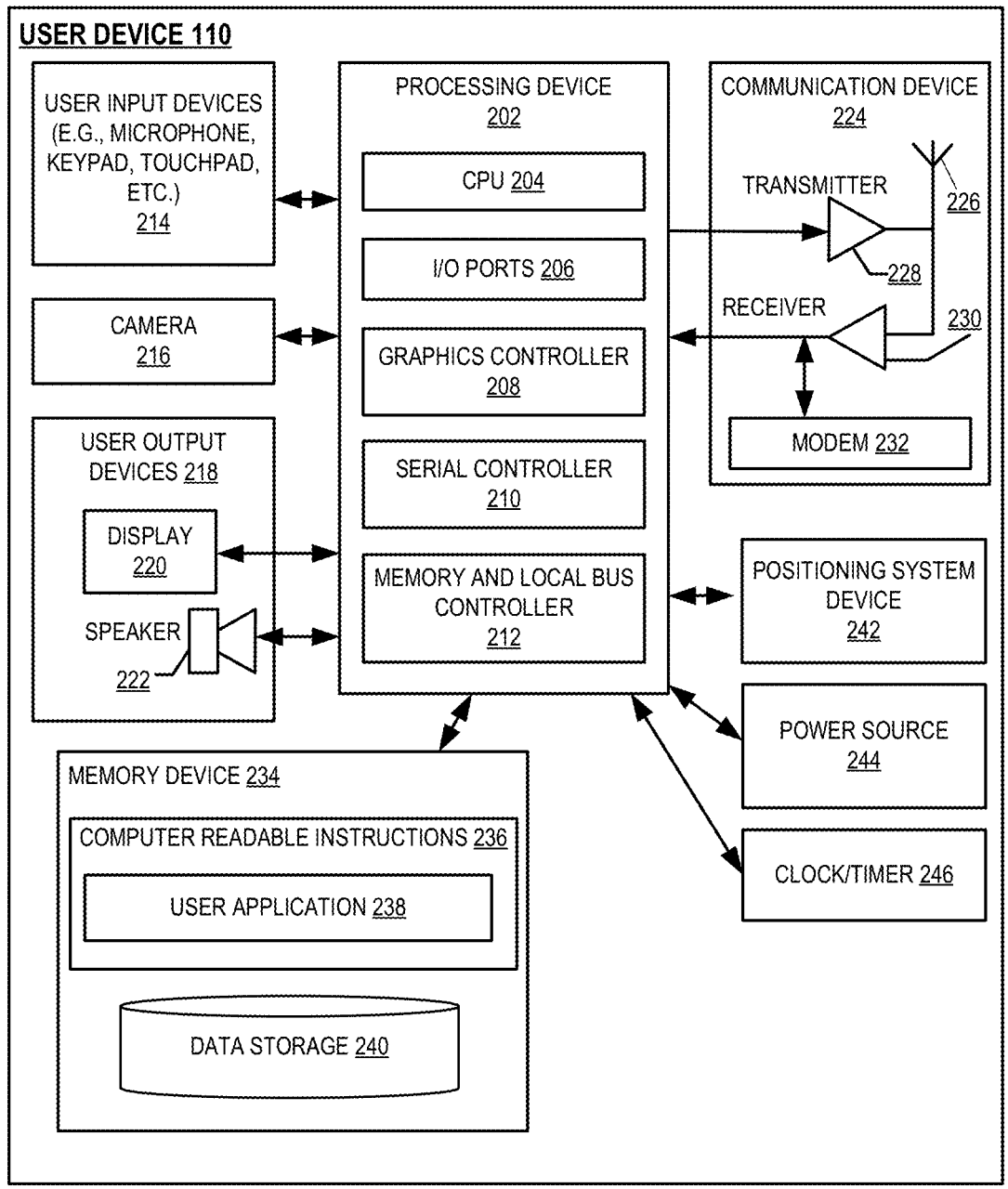
Figure 3:
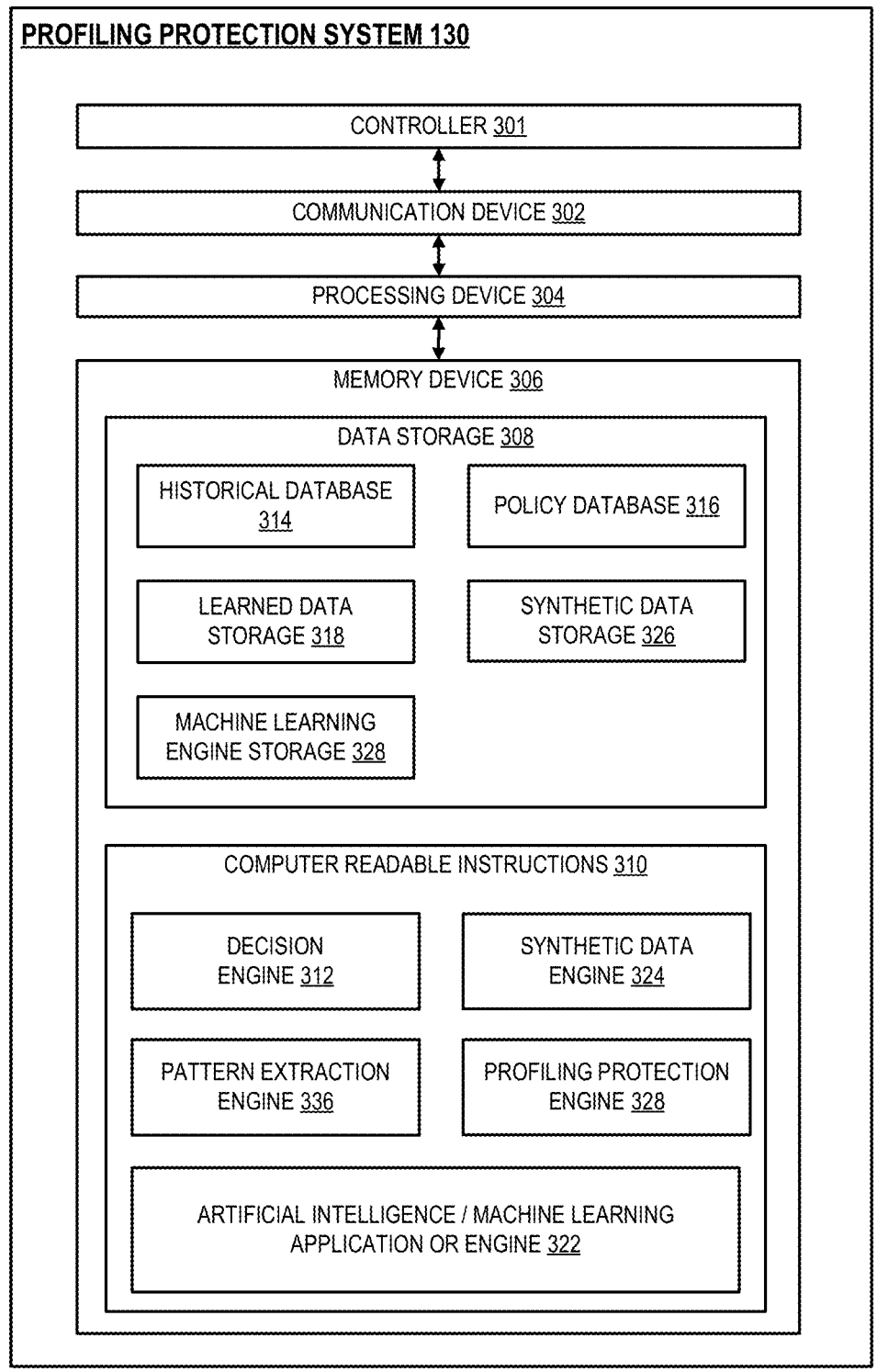
Figure 4:
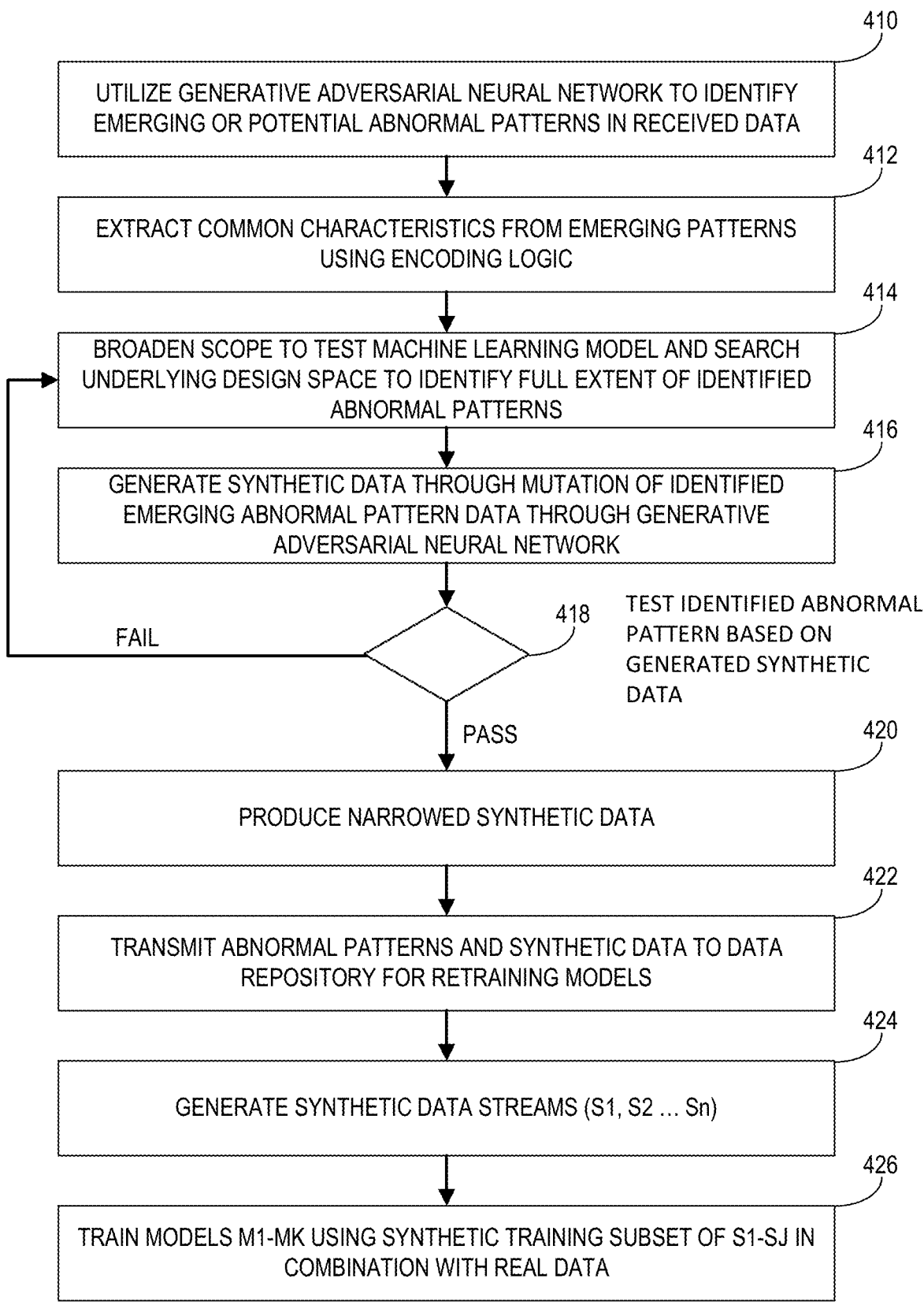
Figure 5:
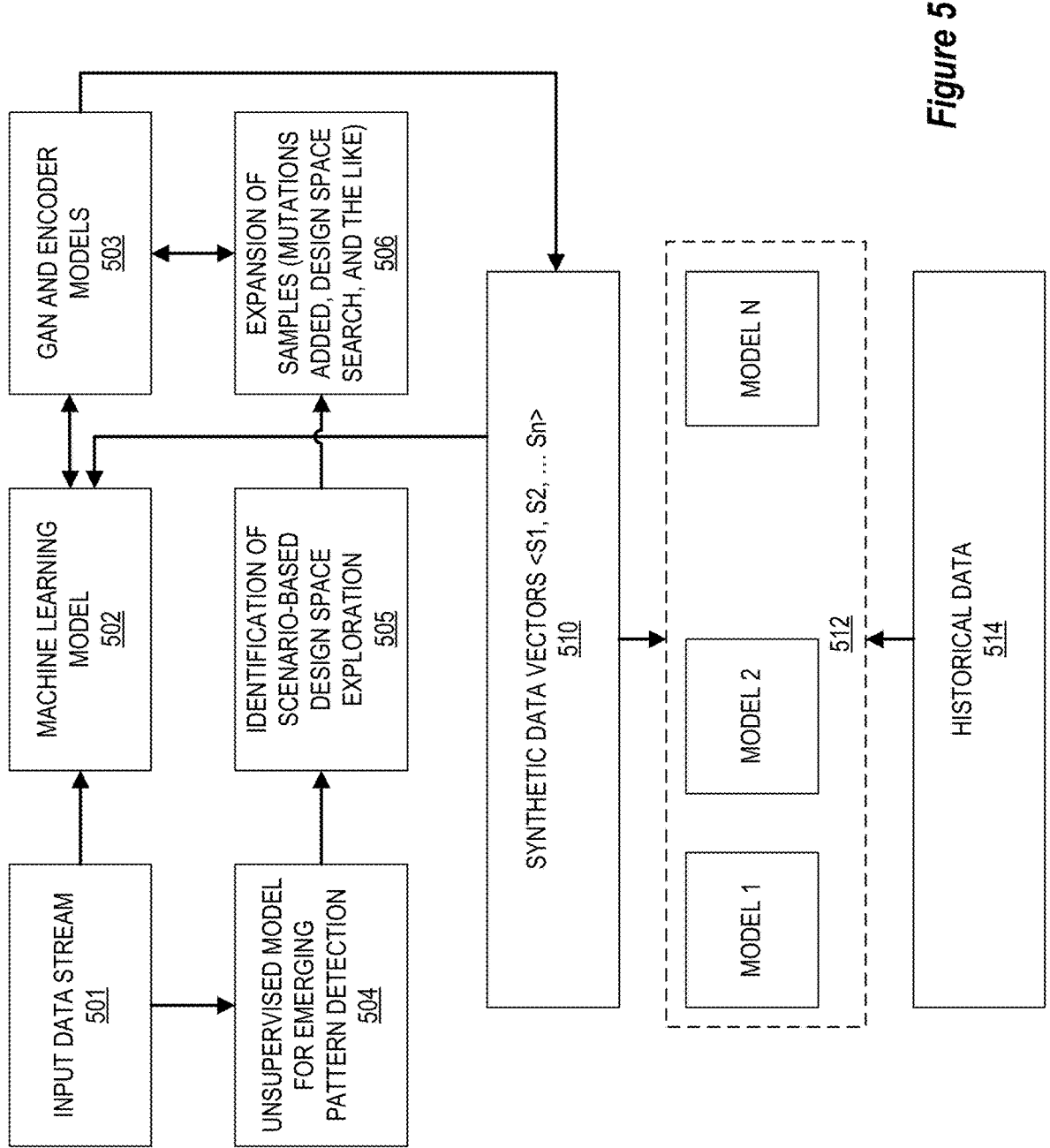

Having thus described embodiments of the invention in general terms, reference will now be made to the accompanying drawings, wherein:

FIG. 1 provides a system environment 100, in accordance with one embodiment of the invention;

FIG. 2 provides a block diagram of a user device 110, in accordance with one embodiment of the invention;

FIG. 3 provides a block diagram of a synthetic data generation system, in accordance with one embodiment of the invention;

FIG. 4 provides a high level process flow for identification of abnormal data patterns and generation of synthetic data, in accordance with one embodiment of the invention; and FIG. 5 provides a block diagram of synthetic data clustering and model development, in accordance with one embodiment of the invention.

DETAILED DESCRIPTION OF EMBODIMENTS OF THE INVENTION

Embodiments of the system, as described herein leverage artificial intelligence, machine-learning, and/or other complex, specific-use computer systems to provide a novel approach for generating synthetic training data based on identified emerging patterns of abnormality in received data through the use of generative adversarial networks (GAN). The system utilizes machine learning models to process received data to determine if emerging patterns of abnormality, which may indicate malfeasance or a vulnerability of the system. The system may intelligently identify additional incoming data as abnormal and detect further vulnerabilities indicated by patterns in received data as the machine learning model is trained over time using historical data. In instances where amount of historical data available to train the machine learning model is limited, the system broadens the scope of historical data and uses GAN encoder models in order to generate expanded clusters of synthetic data that can be fed back to multiple machine learning models in order to retrain the machine learning models for various scenarios and enable incremental machine learning of relevant patterns to occur.

A generative adversarial network (GAN) is a class of machine learning systems. Two neural networks contest with each other in a zero-sum framework in a form of unsupervised learning or semi-supervised learning. The generative network generates data while the conditional network evaluates the generated data. The contest operates in terms of data distributions, and typically the generative network learns to map from a latent space to a data distribution of interest, while the conditional network distinguishes data produced by the generator from the true data distribution. The generative network's training objective is to increase the error rate of the conditional network or "fool" the conditional network by producing novel data that the conditional model discerns as not synthesized, or are part of the true data distribution. A known dataset serves as the initial training data for the conditional network. Training the conditional model involves presenting it with samples from a training dataset, until it achieves acceptable accuracy. The generator trains based on whether it succeeds in fooling the conditional network. Typically the generator is seeded with randomized input that is sampled from a predefined latent space, such as a multivariate normal distribution. Thereafter, data synthesized by the generator are evaluated by the conditional network. As such, a GAN architecture is a useful tool in generating synthetic data that mimics historical training data.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "user" may refer to any entity or individual associated with the collaborative machine learning system. In some embodiments, a user may be a computing device user, a phone user, a mobile device application user, a customer of an entity or business, a system operator, and/or employee of an entity (e.g., a financial institution). In a specific embodiment, a user may be a managing user of a machine learning model, wherein the system enables the user to reconfigure the model based on user-specified criteria and policies. In another specific embodiment, a user may be a customer accessing a user account via an associated user device, wherein data from an interaction between the user and an entity is analyzed or processed by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, or any combination of the aforementioned. The device may be used by the user to access the system directly or through an application, online portal, internet browser, virtual private network, or other connection channel.

As used herein, the term "entity" may be used to include any organization or collection of users that may interact with the collaborative machine learning system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, management firms, insurance companies and the like. In other embodiments, an entity may be a business, organization, a government organization or the like that is not a financial institution.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise analyzing performance of one or more machine learning models or engines using performance metrics associated with one or more of the models.

As used herein, an "interaction" may refer to any action or communication between users, entities, or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface (e.g., clicking, swiping, text or data entry, and the like), authentication actions (e.g., signing-in, username and password entry, PIN entry, and the like), account actions (e.g., account access, fund transfers, and the like) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity.

FIG. 1 provides a system environment 100, in accordance with one embodiment of the invention. As illustrated in FIG. 1, synthetic data generation system 130 is operatively coupled, via a network 101, to the user device(s) 110 (e.g., a mobile phone, computer, laptop, tablet, terminal, automated teller machine, wearable device, and the like), third party system 140, and entity system 120. While only one third party system 140 is depicted in the embodiment shown in FIG. 1, it is understood that the network 101 may interconnect synthetic data generation system 130, entity system 120, and user device 110 with multiple third party systems 140. In this way, the synthetic data generation system 130 can send information to and receive information from the user device 110, the third party system 140 and the entity system 120. In the illustrated embodiment, the plurality of user devices 110 provide a plurality of communication channels through which the entity system 120, third party system 140, and/or the synthetic data generation system 130 may communicate with the user 102 over the network 101.

In the illustrated embodiment, the synthetic data generation system 130 further comprises an artificial intelligence (AI) system 130a and a machine learning system 130b which may be separate systems operating together with the synthetic data generation system 130 or integrated within the synthetic data generation system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein. Non-limiting examples of applications in which the system described herein may be incorporated include cybersecurity, marketing, misappropriation detection, medicine, autonomous device (e.g., self-driving cars), AI assistants, and the like. In some embodiments, interactions performed between the user device(s) 110 and the third party system 140 are intercepted and received by the synthetic data generation system 130, wherein interaction data may be extracted from an interaction over the network 101 by the synthetic data generation system 130 for decisioning. Data monitored and/or extracted by the system may include, in a non-limiting example, user identifying information, communication history, transaction history, and the like. Data, such as user interaction data, may be acquired from across communication channels of an entity such as phone lines, text messaging systems, email, applications (e.g., mobile applications), websites, automated teller machines (ATMs), card readers, call centers, electronic assistants, instant messaging systems, interactive voice response (IVR) systems, brick-and-mortar locations and the like.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with the entity system 120 via a user device 110 while a data flow or data stream between the user device 110 and the entity system 120 is monitored by or received by the synthetic data generation system 130 over the network 101 to be processed or analyzed. In some embodiments a user 102 is a user requesting service from the entity (e.g., customer service) or interacting with an account maintained by the entity system 120. In an alternative embodiment, the user 102 is a user interacting with, maintaining, or employing a machine learning model, wherein the system enables the user to reconfigure the model based on user-specified criteria and policies.

FIG. 2 provides a block diagram of the user device 110, in accordance with one embodiment of the invention. The user device 110 may generally include a processing device or processor 202 communicably coupled to devices such as, a memory device 234, user output devices 218 (for example, a user display device 220, or a speaker 222), user input devices 214 (such as a microphone, keypad, touchpad, touch screen, and the like), a communication device 224, a power source 244, a clock or other timer 246, a visual capture device such as a camera 216, a positioning system device 242, such as a geo-positioning system device like a GPS device, an accelerometer, and the like. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In one embodiment, the user 102 is a maintaining entity of a synthetic data generation system 130, wherein the user application enables the user 102 to define policies and reconfigure a the machine learning model. In one embodiment, the user 102 is a customer of a financial entity and the user application 238 is an online banking application providing access to the entity system 120 wherein the user may interact with a user account via a user interface of the user application 238, wherein the user interactions may be provided in a data stream as an input to one or more machine learning models. In some embodiments, the user 102 may be the subject of schemes or patterns which are detected by synthetic data generation system 130, later to referred to herein as a subset of user called a target user 410.

The processing device 202 may be configured to use the communication device 224 to communicate with one or more other devices on a network 101 such as, but not limited to the entity system 120 and the synthetic data generation system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance, audio frequency, ultrasound frequency, or other communication/data networks.

The user device 110 may also include a memory buffer, cache memory or temporary memory device operatively coupled to the processing device 202. Typically, one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 120 (as illustrated in FIG. 1) which is connected to the user device 110 and the synthetic data generation system 130 and which may be associated with one or more entities, institutions or the like. In this way, while only one entity system 120 is illustrated in FIG. 1, it is understood that multiple networked systems may make up the system environment 100. The entity system 120 generally comprises a communication device, a processing device, and a memory device. The entity system 120 comprises computer-readable instructions stored in the memory device, which in one embodiment includes the computer-readable instructions of an entity application. The entity system 120 may communicate with the user device 110 and the synthetic data generation system 130 to provide access to user accounts stored and maintained on the entity system 120. In some embodiments, the entity system 120 may communicate with the synthetic data generation system 130 during an interaction with a user 102 in real-time, wherein user interactions may be monitored and processed by the synthetic data generation system 130 in order to analyze interactions with the user 102 and reconfigure the machine learning model in response to changes in a received or monitored data stream. In one embodiment, the system is configured to receive data for decisioning, wherein the received data is processed and analyzed by the machine learning model to determine a conclusion.

FIG. 3 provides a block diagram of the synthetic data generation system 130, in accordance with one embodiment of the invention. The synthetic data generation system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the synthetic data generation system 130, in order to interface and manage data flow between systems while executing commands to control the systems. In some embodiments, the controller may be integrated into one or more of the systems described herein. In some embodiments, the controller may perform one or more of the processes, actions, or commands described herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the synthetic data generation system 130 comprises computer-readable instructions 310 stored in the memory device 306, which in one embodiment includes the computer-readable instructions 310 of a decision engine 312, a synthetic data engine 324, a pattern extraction engine 336, a protection engine 328, and an artificial intelligence application or engine 322 which further comprises a machine learning engine. In one embodiment, the artificial intelligence application 322 and machine learning engine may be utilized by the decision engine 312, synthetic data engine 324, pattern extraction engine 336, and/or protection engine 320 to, respectively, analyze performance metrics of a machine learning model and generate synthetic data for injection into channels of communication between a target user and an entity which has been identified as utilizing adversarial categorization.

In some embodiments, the memory device 306 includes data storage 308 for storing data related to the system environment, but not limited to data created and/or used by the decision engine 312, synthetic data application 314, pattern extraction engine 336, protection engine 328, and artificial intelligence application 322. Storage of data related to the system entrainment may include various databases such as historical database 314, policy database 316, learned data storage 318, synthetic data storage 326, and the machine learning engine storage 328.

The historical database 314 is used to store information regarding past interactions (e.g., account actions, transactions, communications, inputs) and/or content of a past data stream. In some embodiments, the historical database 314 may be configured to store data from an incoming data stream in real-time. In some embodiments, the policy database 316 is configured to store pre-determined policies, conditions, rules, thresholds, user data or the like for evaluating and managing the synthetic data generation system 130 (e.g., model configurations, and model adaptations). The policy database 316 may further be configured to store learned policies, conditions, rules, thresholds, or the like as determined in real-time by the machine learning models of the system described herein. In some embodiments, the policy database 316 is further configured to store metrics, system performance metrics, cost metrics, benefit metrics, cost-change metrics, adversarial scenarios or data, extrapolated scenarios or data, and the like associated with the synthetic data generation system 130. In some embodiments, the policy database 316 and/or the historical database 314 include pre-existing training data for training a machine learning or artificial intelligence engine. In some embodiments, the policy database 316 is configured for storing settings associated with the system itself such as energy efficiency settings, computer resource use efficiency settings, response time settings, regulatory guidelines, and the like.

The synthetic data storage 326 is configured to store synthetically generated data generated by the system (i.e., via synthetic data engine 324). The synthetic data stored in the synthetic data storage 326 may be used for training a machine learning model or artificial intelligence engine, and may also be combined with historical data or user data in order to create synthetic user data, as further discussed in FIG. 8. The synthetic data storage 326 may include adversarial or extrapolated scenarios or data generated by the systems described herein which may be fed back into machine learning models to train the system. In some embodiments, the system 130 may include an adversarial function configured for providing adversarial learning and modeling to the system by introducing unreliable or erroneous data to the system; a learning or adaptation function for defining system response to data changes or an adaptation rate for implementing changes (i.e., model reconfiguration) within an architecture of the systems described herein; and an alertness function and robustness function for defining an appropriate system reaction, response, or extent of system reaction based on one or more environmental conditions or previous interactions. In some embodiments, various synthetic data may be injected in an outgoing data stream in real-time and over multiple iterations in order to further aid in identifying profiling patterns by analyzing the various responses received in correspondence to the synthetic data.

The machine learning engine storage 328 is configured for storing one or more artificial intelligence engines, machine learning models, or the like. The AI engines and machine learning models described herein may include engines and/or models directed to, for example, cybersecurity, marketing, misappropriation detection, medicine, autonomous deices (e.g., self-driving cars), AI assistants, or the like. In one embodiment, the machine learning engine storage 328 is configured to store a collection of diverse machine learning engines/models to provide the system with a high level of adaptability to constantly changing environments (i.e., changes in a received data stream).

In one embodiment of the invention, the synthetic data generation system 130 may associate with applications having computer-executable program code that instructs the processing device 304 to perform certain functions described herein. In one embodiment, the computer-executable program code of an application associated with the user device 110 and/or the entity system 120 may also instruct the processing device 304 to perform certain logic, data processing, and data storing functions of the application. In one embodiment, the synthetic data generation system 130 further comprises a dynamic optimization algorithm to be executed by the processing device 304 or a controller 301 for reconfiguring a machine learning model based on, for example, analyzed performance metrics. That said, the algorithm may further include a data pattern of a streamed data source a data output from one or more models, or the like during an assessment of a new model reconfiguration. The dynamic optimization algorithm may further receive the data stream and identified changes to the data stream in real-time for determining reconfigurations.

In non-limiting embodiments, the data stream includes such as system hardware information (e.g., hardware energy usage) or other non-financial authentication information data (e.g., cybersecurity). In still other embodiments, the data stream may contain data collected by a security system for detecting intrusion (e.g., video monitoring, motion detecting, or the like). In other non-limiting examples of data monitored within the data stream include information regarding past, current, or scheduled transactions or other financial data associated with the user. Transaction information may include transaction amounts, payor and/or payee information, transaction dates and times, transaction locations, transaction frequencies, and the like. In some embodiments, data may include information regarding account usage. For example, the data stream may include information regarding usage of a credit or debit card account such as locations or time periods where the card was used. In another example, the data may further include merchants with whom the user frequently interacts.

In some embodiments, the data stream may contain information regarding characteristics of the data itself which may be monitored by the system. For example, the data stream may contain information regarding the quality of the data (e.g., file size, bit rate of stream), the fidelity of the data (i.e., data accuracy), mutability of the data stream (i.e., how quickly a data pattern in the data stream changes).

The system receives the streaming data where the data is then analyzed and processed by one or more machine learning models for decisioning purposes. Machine learning models, individually and/or structured as clusters, may be trained based on predetermined training data and/or new data acquired in real-time (i.e., from the data stream), wherein the system learns from the data by dynamically identifying patterns as the information is received and processed. In some embodiments of the present invention, machine learning models may be adaptive, wherein the models may be reconfigured based on different environmental conditions and/or an analysis and evaluation of the individual model performance. The model may be modified by the system by having one or more individual models and/or clusters added, removed, made inactive, or the like. In another example, the system may weight particular the conclusions of particular models and/or model clusters more than others. Population architecture refers to a collection and particular arrangement of active machine learning models and/or clusters of machine learning models that are configured to process information mathematically or computationally to make decisions. Particular models and/or clusters may be weighted by the system to emphasize the impact or contribution of the particular models and/or clusters over others.

Embodiments of the synthetic data generation system 130 may include multiple systems, servers, computers or the like maintained by one or many entities. In some embodiments, the synthetic data generation system 130 may be part of the entity system 120. In other embodiments, the entity system 120 is distinct from the synthetic data generation system 130. The synthetic data generation system 130 may communicate with the entity system 120 via a secure connection generated for secure encrypted communications between the two systems either over the network 101 or alternative to the network 101.

FIG. 4 provides a high level process flow for generating synthetic data for use in training machine learning models, in accordance with one embodiment of the present invention. The process begins by utilizing the generative adversarial neural network (GAN) to identify emerging or potential abnormal patterns in received data, as shown in block 410. Common characteristics from emerging patterns are extracted using encoding or autoencoding logic, as indicated in block 412. The received data indicates specific scenarios where interactions between users, users and devices, or resource transfers take place. The scenarios indicated by the received data are determined and may include any number of data characteristics. In some embodiments involving resource transfer, such data characteristics may include specific user, user account, resource account, resource type, entity, resource transfer method, communication channel, device type, time of day, geographic location and the like. For instance, in one embodiment involving resource transfer, the system may receive data that indicates an abnormal scenario where a specific user utilizes a resource transfer instrument in a certain manner to make use of a specific vulnerability. In one embodiment, the system may receive data to indicate that the user utilizes a resource transfer instrument, such as a payment card with security chip technology, in a "fallback" mode where the resource transfer is initiated via magnetic strip to bypass the security check initiated with the security chip technology. In another embodiment, the user may be using a known technique to jam an automated teller machine (ATM) and capitalize on the vulnerability to initiate malfeasant resource transfers. The system may use characteristics of identified abnormal scenarios in order to identify common characteristics between the scenarios that indicate abnormal activity or potential vulnerabilities. For instance, in some embodiments the majority of abnormal activity associated with a particular vulnerability may originate from a common device, such as a particular ATM, or may all originate from a common user, geographic location, and the like.

Moving to block 414, the scope of the received data is then broadened and tested against the machine learning model in order to search the underlying design space and identify the full extent of identified abnormal patterns in order to determine if the vulnerability still exists for the broadened dataset. For instance, an identified abnormal pattern in received data may be altered in some way in various interactions where any number of characteristics of a given scenario are altered, such as, but not limited to, user, user account, resource account, resource type, entity, resource transfer method, communication channel, device type, time of day, operating system, geographic location and the like. As an example, one embodiment the identified abnormal pattern may be associated with a specific operating system version on a mobile device type. This received data may be broadened to include a number of other versions of the same operating system for the mobile device type, and may be analyzed and tested to determine if the vulnerability still exists for the scenarios that include the additional operating system versions. Next, as is shown in block 416, the broadened data set may be mutated using GAN architecture. The GAN architecture generates varied data based on the broadened data set that includes iterative or random hypothetical variations for a number of data characteristics, also referred to as synthetic data. As shown in the decision diamond 418, the generated synthetic data is then tested to determine if the synthetic data exhibits the same identified abnormal pattern that has been identified as being associated with a potential vulnerability. This testing process results in a narrowed synthetic data set as shown in block 420.

FIG. 5 provides a block diagram of synthetic data clustering and model development, in accordance with one embodiment of the invention. As shown, the machine learning model 502 receives data from input data stream 501. The synthetic data generation system 130 is designed to receive, produce, store and analyze data from a number of sources and third party systems 140. It is understood that the synthetic data generation system 130 may be designed to acquire data from a number of public and private sources, which may be internal sources (i.e. controlled or owned by the same entity implementing and managing the synthetic data generation system 130) or external sources, such as from one or more third party systems 140. Data may be analyzed by a combination of neural network based learning engines and comparison modules of the synthetic data generation system 130 such as artificial intelligence and machine learning engine 322. Input data stream 501 is also fed to unsupervised model(s), or in some embodiments semi-supervised learning model(s), for emerging pattern detection, as depicted by block 504. The input data 501 is used to identify scenario-based design space exploration opportunities, as shown at block 505. As discussed previously with respect to FIG. 4, the scenario-based design exploration can take on a number of different forms depending on the embodiment of the invention and the dataset provided in input data stream 501. Samples of the identified scenario-based data from block 505 may be expanded using GAN encoder models, as shown in blocks 506 and 503.

The scope of the data received from GAN encoder models 503 is then broadened and tested against the machine learning model in order to search the underlying design space and identify the full extent of identified abnormal patterns in order to determine if the vulnerability still exists for the broadened dataset, as shown by the bi-directional flow of data between machine learning model 502 and GAN encoder models 503. For instance, an identified abnormal pattern in received data may be altered in some way in various interactions where any number of characteristics of a given scenario are altered. The result of the GAN encoding process and refinement through machine learning model 502 is the production of synthetic data vectors, including, for example, S1, S2, Sn and the like, as shown in block 510. The various synthetic data vectors are used to train various models such as model 1, model 2, model N and the like, as shown in block 512. It is understood that the models depicted in block 512 may be representative of a single model or an ensemble of models determined by the synthetic data generation system 130 to be most accurate at identifying relevant patterns. The models shown in block 512 are also design to receive training data from other sources, such as historical data shown at block 514. Historical data 514 may include data related to a population of user that the synthetic data generation system 130 has received or acquired related to one or more past interactions of users 102 or entities, such as, but not limited to, account data, transaction data, public record data, browsing history, polling data, academic record data, legal record data, metadata associated with communications involving the user 102 (e.g. timestamp, location, file size, device settings/characteristics, and the like), and past treatments and identified decisions from third party systems that may have affected the user 102. Historical data 514 may also include decision history of the synthetic data generation system 130. Data may be analyzed by a combination of neural network based learning engines and comparison modules of the synthetic data generation system 130 such as artificial intelligence and machine learning engine 322.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with collaborative machine learning and population reconfiguration.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 8942US1.014033.3408 | To be assigned | SYSTEM AND METHODS FOR ITERATIVE SYNTHETIC DATA GENERATION AND REFINEMENT OF MACHINE LEARNING MODELS | Concurrently herewith |

What is claimed is:

1. A system for generation of synthetic data cluster vectors, the system comprising:
a module containing a memory storage device, a communication device, and a processor, with computer-readable program code stored thereon, wherein executing the computer-readable code is configured to cause the processor to:
receive input data for analysis and expansion;
analyze the input data using a machine learning model to identify an emerging pattern in the input data;
extract common data characteristics from the identified emerging pattern in order to determine a data scenario;
expand the data scenario via general adversarial neural network encoding to produce expanded data scenarios;
batch the expanded data scenarios to create multiple synthetic data sets containing varied subsets of the expanded data scenarios;
generate one or more synthetic data vectors comprising one or more of the multiple synthetic data sets; and
transmit the one or more synthetic data vectors to one or more machine learning models in order to train the models based on varied subsets of the expanded data scenarios.

2. The system of claim 1, wherein generating the multiple synthetic data sets further comprises refining the multiple synthetic data sets by:
processing the synthetic data set using the machine learning model to determine if the synthetic data set fits the identified emerging pattern; and
iteratively narrowing scope of one or more of the multiple synthetic data sets based the results from the machine learning model.

3. The system of claim 1, wherein the system is further configured to:
determine one or more machine learning models as appropriate for the identified emerging pattern; and
generate an ensemble of one or more machine learning models according to the identified emerging pattern.

4. The system of claim 1, wherein the machine learning model is retrained using a combination of real input data and one or more synthetic data vectors.

5. The system of claim 1, further configured to:
generate a machine learning model ensemble of the one or more machine learning models; and
identify additional emerging patterns in the received input data.

6. The system of claim 5, wherein the machine learning model ensemble is continuously updated to include a subset of one or more additional machine learning models determined to meet a threshold of accuracy in identifying emerging patterns in received input data.

7. The system of claim 1, further comprising:
receiving a continuous input data feed;
continually updating the emerging pattern detected by the machine learning model;
extracting common data characteristics from the updated emerging pattern;
determining if the data scenario requires adjustment based on the updated emerging pattern; and
continually producing additional synthetic data vectors for the multiple synthetic data sets via the generative adversarial neural network.

8. A computer-implemented method for iterative synthetic data generation, the computer-implemented method comprising:
receive input data for analysis and expansion;
analyze the input data using a machine learning model to identify an emerging pattern in the input data;
extract common data characteristics from the identified emerging pattern in order to determine a data scenario;
expand the data scenario via general adversarial neural network encoding to produce expanded data scenarios;
batch the expanded data scenarios to create multiple synthetic data sets containing varied subsets of the expanded data scenarios;
generate one or more synthetic data vectors comprising one or more of the multiple synthetic data sets; and
transmit the one or more synthetic data vectors to one or more machine learning models in order to train the models based on varied subsets of the expanded data scenarios.

9. The computer-implemented method of claim 8, wherein generating the synthetic data set further comprises refining the multiple synthetic data sets by:
processing the multiple synthetic data sets using the machine learning model to determine if the synthetic data set fits the identified emerging pattern; and
iteratively narrowing scope of one or more of the multiple synthetic data sets based the results from the machine learning model.

10. The computer-implemented method of claim 8, further comprising:
determining one or more machine learning models as appropriate for the identified emerging pattern; and
generating an ensemble of one or more machine learning models according to the identified emerging pattern.

11. The computer-implemented method of claim 8, wherein the machine learning model is retrained using a combination of real input data and one or more synthetic data vectors.

12. The computer-implemented method of claim 8, further comprising:

generate a machine learning model ensemble of the one or more machine learning models; and identify additional emerging patterns in the received input data.

13. The computer-implemented method of claim 12, wherein the machine learning model ensemble is continuously updated to include a subset of one or more additional machine learning models determined to meet a threshold of accuracy in identifying emerging patterns in received input data.

14. The computer-implemented method of claim 8, further comprising:

receiving a continuous input data feed;

continually updating the emerging pattern detected by the machine learning model;

extracting common data characteristics from the updated emerging pattern;

determining if the data scenario requires adjustment based on the updated emerging pattern; and continually producing additional synthetic data vectors via the generative adversarial neural network.

15. A computer program product for iterative synthetic data generation, the computer program product comprising at least one non-transitory computer-readable medium having computer-readable program code portions embodied therein, the computer-readable program code portions comprising:

an executable portion configured for receiving input data for analysis and expansion;

an executable portion configured for analyzing the input data using a machine learning model to identify an emerging pattern in the input data;

an executable portion configured for extracting common data characteristics from the identified emerging pattern in order to determine a data scenario;

an executable portion configured for expanding the data scenario via general adversarial neural network encoding to produce expanded data scenarios;

an executable portion configured for batching the expanded data scenarios to create multiple synthetic data sets containing varied subsets of the expanded data scenarios;

an executable portion configured for generating one or more synthetic data vectors comprising one or more of the multiple synthetic data sets; and an executable portion configured for transmitting the one or more synthetic data vectors to one or more machine learning models in order to train the models based on varied subsets of the expanded data scenarios.

16. The computer program product of claim 15, wherein generating the synthetic data set further comprises refining the synthetic data set by:

processing the multiple synthetic data sets using the machine learning model to determine if the synthetic data set fits the identified emerging pattern; and iteratively narrowing scope of one or more of the multiple synthetic data sets based the results from the machine learning model.

17. The computer program product of claim 15, further comprising:

determining one or more machine learning models as appropriate for the identified emerging pattern; and generating an ensemble of one or more machine learning models according to the identified emerging pattern.

18. The computer program product of claim 15, wherein the machine learning model is retrained using a combination of real input data and one or more synthetic data vectors.

19. The computer program product of claim 15, further comprising:

generate a machine learning model ensemble of the one or more machine learning models; and identify additional emerging patterns in the received input data.

20. The computer-implemented method of claim 19, wherein the machine learning model ensemble is continuously updated to include a subset of one or more additional machine learning models determined to meet a threshold of accuracy in identifying emerging patterns in received input data.

* * * * *